J. W. WILLIAMS.
STEAM GENERATOR FOR CANNING AND COOKING DEVICES.
APPLICATION FILED DEC 31, 1918.
1,344,326.
Patented June 22, 1920.
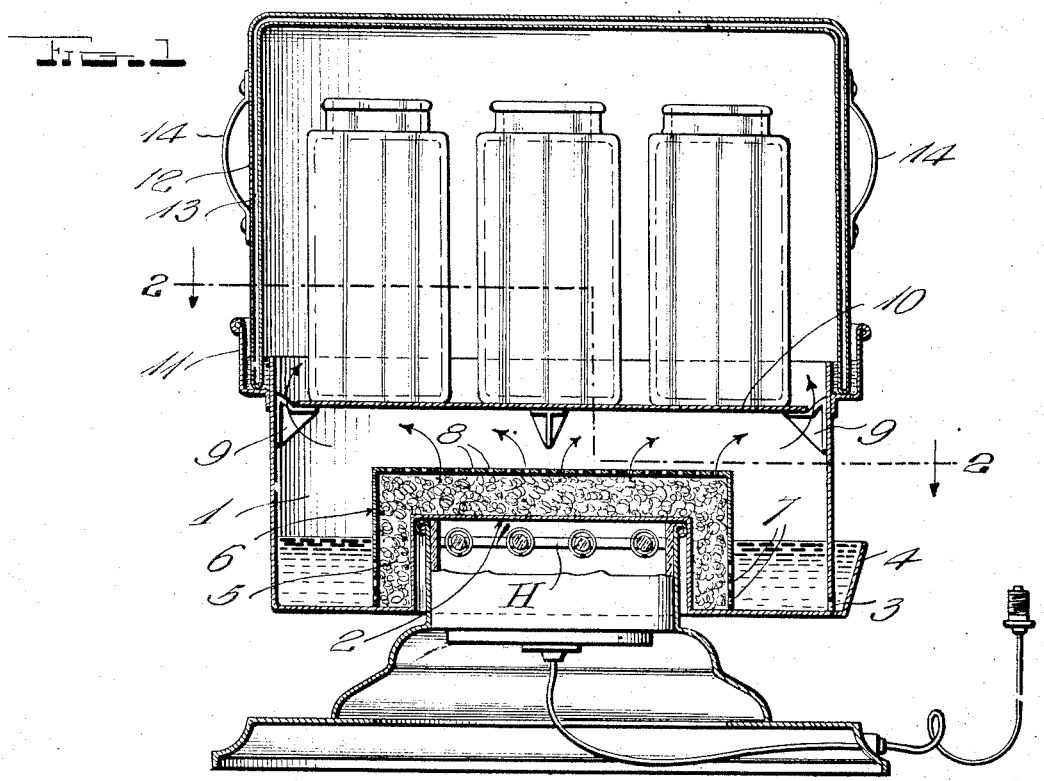
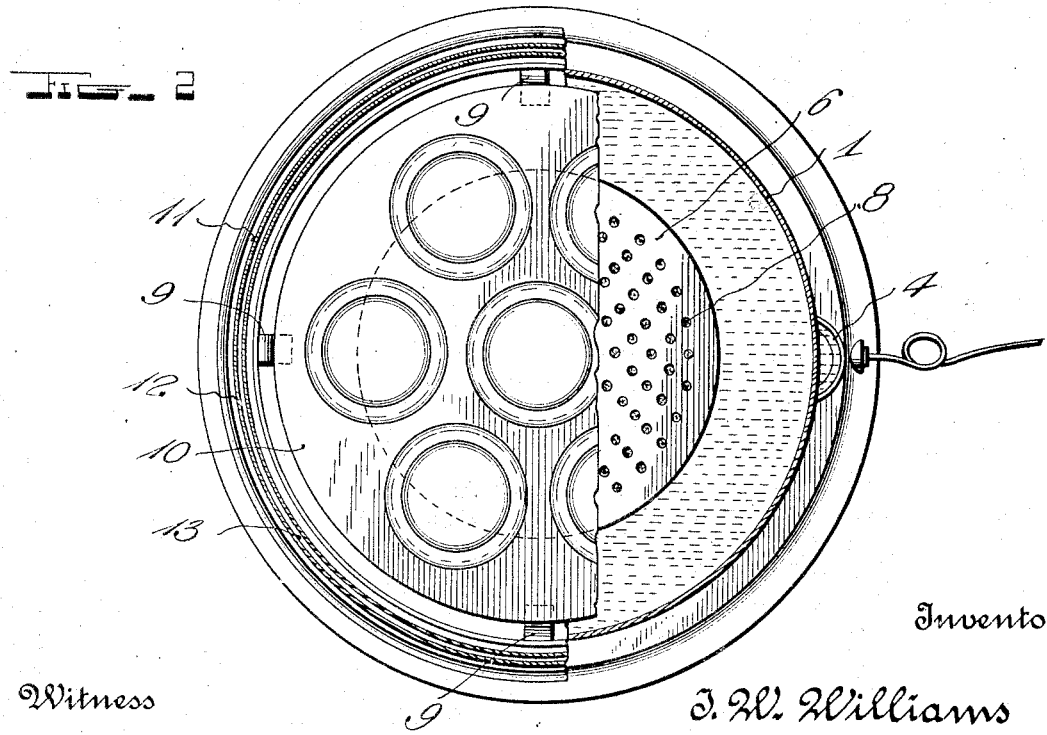
Witness
C. Coombs
Inventor
J. W. Williams
By H. B. Willson & Co.
Attorneys

UNITED STATES PATENT OFFICE.

JAMES W. WILLIAMS, OF SPOKANE, WASHINGTON.

STEAM-GENERATOR FOR CANNING AND COOKING DEVICES.

1,344,326.   Specification of Letters Patent.   Patented June 22, 1920.

Application filed December 31, 1918. Serial No. 269,078.

*To all whom it may concern:*

Be it known that I, JAMES W. WILLIAMS, a citizen of the United States, residing at Spokane, in the county of Spokane and State of Washington, have invented certain new and useful Improvements in Steam-Generators for Canning and Cooking Devices; and I do declare the following to be a full, clear, and exact description of the invention, such as will enable others skilled in the art to which it appertains to make and use the same.

This invention relates to improvements in electrically heated steam generators for canning and cooking purposes.

It has been found in practice that sufficient heat cannot be obtained from ordinary electrical heaters now in use for quickly and satisfactorily generating steam when applied directly to a body of water and it is therefore the principal object of this invention to provide means whereby water may be quickly heated and sufficient steam generated for the purpose desired by the use of the usual or any common well known electrical heating appliance attached to the ordinary electric lamp socket.

Another object is to provide means whereby the water of condensation accumulating on the hood or cover of the generator is carried back or discharged into the water container of the generator.

With this and other objects in view, the invention consists of certain novel features of construction, and the combination and arrangement of parts as will be more fully described and claimed.

In the accompanying drawings:

Figure 1 is a central vertical section of this improved generator; and,

Fig. 2 is a horizontal sectional view taken on the plane indicated by the broken line 2—2 of Fig. 1.

In the drawings 1 denotes the water container of the generator which may be of any suitable size and which is preferably cylindrical in shape. In the center of the bottom of the water container is a central opening from which rises a heating dome 2. This dome extends upwardly for a suitable distance and is adapted to receive the heating element H over which the generator is placed and which preferably supports the same.

In one side of the water container adjacent to the bottom thereof is a filling opening 3 around which is a filling funnel 4. This funnel 4 extends upwardly to the height that it is desired the water to maintain in the water container and serves to indicate when the desired quantity of water has been placed in the container, or in other words, this funnel serves not only as a filling element but also to indicate the level of the water in the container.

Placed over and around the dome 2 is a wick 5 formed of asbestos, mineral wool or similar absorbent material. Placed over the wick 5 is a shield or casing 6 in which, around the lower portion thereof are formed perforations 7 through which the water from the water container reaches the wick and is taken up by capillary attraction until the entire wick is saturated. In the top of the shield or casing 6 are also formed numerous closely arranged perforations 8 through which steam generated from the water taken up by the wick passes.

Arranged on the inner side of the water container near the top thereof are a series of brackets 9 on which rests a jar supporting plate 10 which is of less diameter than the inside diameter of the water container thereby providing a space through which the steam generated from the heated wick passes upwardly. It will be noted that the upper portions of the brackets where they join the sides of the container are formed at an angle so that the jar supporting plate when placed on the bracket will automatically center itself. This will result in a space of uniform width all around the edge of the jar supporting plate.

Arranged around and secured to the outer surface of the water container near its upper edge is an annular gutter 11 the outer wall of which extends a considerable distance above the upper edge of the water container. This gutter is adapted to contain water to the level of the top of the water container and serves as a combined support and water seal for the hood or cover 12 of the generator. The hood or cover is of slightly greater diameter than the water container and is preferably double-walled to provide between the walls a vacuum or dead air space 13 which serves to retain or prevent the radiation of heat. The hood or cover is provided with suitable handles 14 which are preferably arranged on opposite sides thereof as shown.

When in use the jars containing the food to be steamed or cooked are placed on the supporting plate 10 after which the hood or cover 12 is placed over the jars, the lower edge of the hood entering the water in the gutter 11 and resting in the bottom thereof. The water in the gutter thus forms a water seal to prevent the escape of steam entering the hood. The steam which condenses on the sides of the hood runs down into the gutter 11 and owing to the fact that the outer wall of the gutter is higher than the upper edge of the water generator the water of condensation will overflow from the gutter into the water container where it will again be drawn up by the wick.

While I have shown in the drawing an electric heater in the form of a hot plate it will be understood that any suitable form of electric heating appliance may be employed or that heating appliances other than electrical appliances may also be employed with equal advantage.

In the operation of the generator it will be understood that the water from the water container passes through the perforations 7 in the lower portion of the shield or casing 6 and by capillary attraction the entire wick becomes saturated with water. When the heat is applied to the saturated wick by the heating appliance the water in the upper portion of the wick over the dome 2 is quickly heated and turned to steam which passes through the perforations 8 in the top of the shield and upwardly through the space between the supporting plate 10 and the sides of the water container and circulates over and around the jars covered by the hood. As the water in the top of the wick is generated into steam and passes through the perforations 8 more water is drawn up by capillary attraction and being spread out in a comparatively small quantity through the wick and over the dome is heated very rapidly and much more satisfactory results are obtained than when the heat is applied direct to a body of water as will be readily understood.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the claimed invention.

I claim:

1. A device of the class described comprising a water container having a heating dome rising from the bottom thereof and extending above the water level of said container, a wick of absorbent material disposed over and around said dome, a perforated casing disposed over and around said wick, and a heater disposed in said dome.

2. A steam generator of the character described comprising a water container having a heating dome formed therein, a wick arranged around and over said dome, a perforated shield or casing over said wick, a combined filling and overflow funnel arranged on said water container to maintain the level of the water therein at a predetermined distance below the top of the wick, and a hood having a steam tight connection with said water container.

In testimony whereof I have hereunto set my hand.

JAMES W. WILLIAMS.